July 21, 1970   R. BOERSMA   3,520,990
INSULATORS AND METHODS FOR MANUFACTURING SUCH INSULATORS
Filed April 7, 1969

INVENTOR
RINTJE BOERSMA

BY  *Cushin & Smiley*

ATTORNEYS

United States Patent Office 3,520,990
Patented July 21, 1970

3,520,990
INSULATORS AND METHODS FOR MANUFACTURING SUCH INSULATORS
Rintje Boersma, Harmelen, Netherlands, assignor to N.V. "COQ," a company of the Netherlands
Filed Apr. 7, 1969, Ser. No. 813,879
Claims priority, application Netherlands, Apr. 16, 1968, 6805321
Int. Cl. H01b 17/16
U.S. Cl. 174—163                    4 Claims

ABSTRACT OF THE DISCLOSURE

An insulator having a flange formed on the insulator body and a mounting ring, said insulator flange fitting tightly in an annular groove of said ring, all flanks of said insulator flange and all adjacent corresponding flanks of the groove of said ring extending in surfaces of revolution, of which the generating lines are straight lines, which intersect in the same point of the common axis of the flange and the mounting ring.

Figure 1:
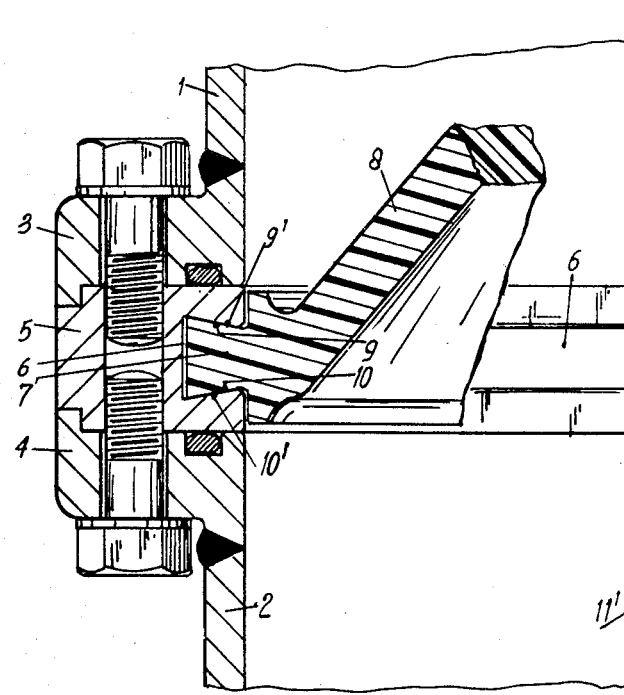

The invention relates to a supporting or a bushing insulator comprising a flange and a concentric metal mounting ring attached thereto for fixing the insulator in an electric apparatus, e.g. metal clad switchgear, and to a method for manufacturing such an insulator.

Insulators of this kind are, besides for supporting electrically alive parts, often used for the gas-tight separation of insulating gas containing compartments of electric apparatus, e.g. switchgear for high voltages. Examples of such insulators are known from the Swiss patent specifications 387,116 and 436,430. In the insulator disclosed in the first mentioned patent specification the insulator body fits accurately in the metal mounting ring and fixed against axial movement in respect of the flange ring by means of an annular key. In switchgear the temperature is apt to vary considerably and may lie between —25° C. and +85° C., so that, in view of the fact that the coefficient of expansion of the insulator body is generally greater than that of the metal mounting ring, the insulator body may disengage itself from the mounting ring at a fall in temperature. Owing thereto not only the mechanical bond between the insulator body and the mounting ring is weakened but also a leak path is produced between the compartments separated by the insulator. In the insulator disclosed by the Swiss patent application 436,430 these disadvantages have been avoided by the fact that the insulating body is provided with a flange which is secured to the metal mounting ring by bolts. However, this insulator has the disadvantage that the metal mounting ring protrudes into the space confined by the earthed metal wall of the electric apparatus. The electric field in said space is affected unfavourably thereby, so that in said space the insulating distances must be made greater.

The invention has the object to provide an insulator which does not have the disadvantages of the mentioned known insulators. It consists in that the insulator flange increases, at least locally radially towards the outer circumference, in thickness and fits tightly in an annular groove of the inner circumference of the mounting ring, said groove increasing, at least locally radially towards the outer circumference, in width, and in addition in that all flanks of said flange and all adjoining flanks of said groove extend in surfaces of revolution, of which the generating lines are straight lines, which intersect in the same point of the common axis of the insulator flange and the mounting ring. Consequently, said surfaces of revolution are all or all except one conical surface. The surface differing from a conical surface can only be a plane which is directed transversely to said axis.

In order to make sure that the flange of the insulator body is kept tightly fitted with pre-stress in the mounting ring at each temperature below the maximum operational temperature of say 85° C. a method for manufacturing a supporting or a bushing insulator having an insulator body of casting resin and constructed in accordance with the invention is preferred, according to which the insulator body is secured by casting to the mounting ring and both said ring and said body are kept during the casting and the curing of the casting resin at a temperature above the maximum operational temperature of the insulator, e.g. at a temperature between 120 and 140° C. During the setting and during the following cooling down the insulator body shrinks and said body and the metal mounting ring, shink respectively, in such a manner, that at a temperature between 90 and 100° C. the insulator body becomes wedged in the groove of the mounting ring and said ring holds the insulator flange tightly with a force which remains substantially constant at a further cooling-off, as will be explained hereinafter.

Figure 3:
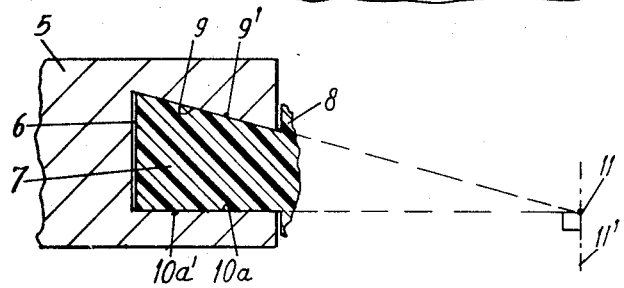
Figure 4:
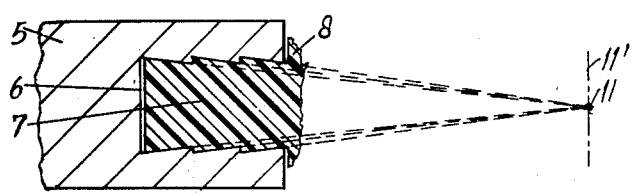
Figure 2:
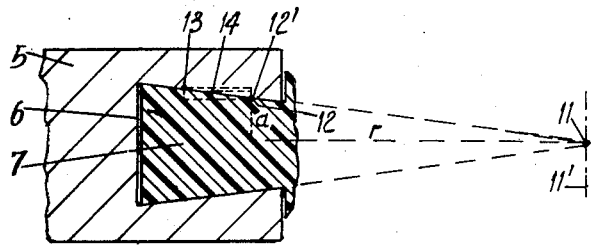

The invention will be elucidated with the aid of the drawing. Therein is:

FIG. 1 an axial sectional view of a part of a supporting or a bushing insulator constructed according to the invention and mounted in a tubular metal envelope to be connected to earth, FIG. 2 on a slightly enlarged scale a diagrammatical illustration of said sectional view, FIG. 3 is a diagrammatical illustration of an axial sectional view of a part of a variant of the insulator shown in FIGS. 1 and 2, and FIG. 4 is a diagrammatical illustration of an axial sectional view of a part of a second variant of said insulator.

In FIG. 1 of the drawings 1 and 2 are parts of a tubular metal envelope to be connected with earth. Clamped between the flanges 3, 4 of these parts is a metal mounting ring 5 which has in its inner circumference an annular groove 6 having a dovetail cross section. A flange 7 of the casting resin body of a supporting or bushing insulator 8, said flange having a corresponding dovetail cross section, is fitted tightly in said groove. This tight fit is obtained from the fact that the insulator body 7, 8 is secured to the mounting ring 5 by casting and thereupon is cured at a temperature above 100° C., e.g. a temperature between 120 and 140° C., and also from the fact that the property is used that the casting resin, both during setting and during cooling down to a temperature between 90 and 100° C., shrinks more than during the cooling off below said temperature. Owing to the shrinkage during the setting of the casting resin and the higher shrinkage thereof during the cooling down at temperatures above 90 or 100° C. the flange 7 becomes wedged in the groove 6 of the mounting ring. The flanks 9, 10 of the insulator flange and the flanks 9', 10' of the mounting ring extend in surfaces of cones, the apices of which lie in one and the same point 11 (FIG. 2) of the common axis 11' of the insulator flange 7 and the mounting ring 5.

FIG. 2 shows what will happen when during operation the temperature of the insulator varies, say increases wih the value $\Delta T$.

Assuming the coefficient of expansion of the casting resin of the insulator body 7, 8 and that of the metal of the mounting ring 5 to be $\alpha_1$ and $\alpha_2$, respectively, the point 12 of the flank 9 of the insulator flange 7 will move in radial direction through a distance $r.\alpha_1.\Delta T$ and in axial direction through a distance $a.\alpha_1.\Delta T$. This means that the point 12 moves in the surface of the flank 9 and will reach the point 13. In the same way the point 12' coinciding with the point 12 and forming part of the flank 9' of the mounting ring will move in radial direction through a distance $r.\alpha_2.\Delta T$ and in axial direction through a distance $a.\alpha_2.\Delta T$, so that also that point will move in the surface of the flank 9' and will reach, in the case in question, the point 14. The result of this construction is that the clamping force exerted between the mounting ring 5 and the insulator flange 7 remains the same as the one before the rise of temperature. The flanks 9 and 9' only slide in their surfaces one over the other. It will be apparent that the same effect is produced when the temperature falls down. Consequently, the bond between the insulator flange and the mounting ring remains mechanically strong and gas-tight under all circumstances.

FIG. 3 shows that it is not necessary that both flanks of the insulator flange 5 and the mounting ring 5 extend in conical surfaces. In the embodiment shown in FIG. 3 the flanks 10a and 10a' lie in a plane at right angles with the common axis 11' of the insulator flange and the mounting ring.

In the embodiment illustrated in FIG. 4 and adapted to be used in case the mounting ring 5 can have a small thickness only but the insulator flange 7 must be mechanically strong the flanks of the insulator flange and those of the groove of the mounting ring are made step-shaped so that their cross sectional areas have the shape of saw teeth. In this embodiment one must see to it that all flank parts come to lie in the surfaces of cones, the apices of which all lie in the point 11 of the common axis 11' of the insulator flange and the mounting ring.

It will be obvious that only the conical flanks 9, 9' of the embodiment shown in FIG. 3 can be made step-shaped as shown in FIG. 4 but the flanks 10a, 10a' of said embodiment cannot.

What I claim is:

1. A supporting or a bushing insulator comprising a flange and a concentric metal mounting ring attached thereto for fixing the insulator in an electric apparatus, e.g. metal clad switch-gear, said insulator flange increasing, at least locally radially towards the outer circumference, in thickness and fitting tightly in an annular groove of the inner circumference of the mounting ring, said groove increasing at least locally radially towards the outer circumference in width, all flanks of said flange and all adjoining flanks of said groove extending in surfaces of revolution, of which the generating lines are straight lines, which intersect in the same point of the common axis of the insulator flange and the mounting ring.

2. The insulator according to claim 1 wherein said flanks of said flange of said groove are conical.

3. The insulator according to claim 1 wherein one flank of said flange and a corresponding flank of said groove are conical and the other flank of said flange and the corresponding flank of said groove are planar, lying normal to said common axis.

4. The insulator according to claim 1 wherein said flanks of said flange and of said groove are stepped presenting interrupted conical surfaces.

References Cited

UNITED STATES PATENTS

| 3,059,278 | 10/1962 | Daniel | 264—274 X |
| 3,262,076 | 7/1966 | Uenohara | 174—22 X |
| 3,311,164 | 3/1967 | Cox et al. | |
| 3,325,583 | 6/1967 | Frowein | 174—23 X |

FOREIGN PATENTS

| 24,968 | 3/1963 | Germany. |
| 1,397,698 | 3/1965 | France. |
| 242,685 | 11/1946 | Switzerland. |
| 385,951 | 3/1965 | Switzerland. |
| 85,143 | 12/1935 | Sweden. |

LARAMIE E. ASKIN, Primary Examiner

U.S. Cl. X.R.

174—23; 264—274